United States Patent Office 3,312,570

Patented Apr. 4, 1967

3,312,570

PRODUCTION OF EPITAXIAL FILMS OF SEMICONDUCTOR COMPOUND MATERIAL

Robert A. Ruehrwein, Dayton, Ohio, assignor to Monsanto Company, a corporation of Delaware No Drawing. Filed May 29, 1961, Ser. No. 113,108
14 Claims. (Cl. 148—175)

The present invention relates to a method for the production of epitaxial films of large single crystals of inorganic compounds. Epitaxial films which may be prepared in accordance with the invention described herein are prepared from compounds broadly defined as compounds formed from elements of Group III–B of the periodic system having atomic weights of from 10 to 119 with elements of Group V–B having atomic weights of from 12 to 75. Typical compounds within this group include the binary compounds boron phosphide, gallium arsenide, indium arsenide, gallium phosphide and indium phosphide. As examples of ternary compositions within the defined group are those having the formulae $$GaAs_xP_{1-x}$$

and $InAs_xP_{1-x}$, $x$ having a numerical value greater than zero and less than 1. The periodic system or table referred to in the present grouping including Group III–B elements of the periodic system such as boron, gallium and indium, and Group V–B elements such as arsenic and phosphorous is the Hubbard form of the periodic table. This is illustrated in William F. Meggers, "Key to Periodic Chart of the Elements," 1954 edition, published by W. M. Welch Scientific Company. The periodic table is found following page 24.

It is an object of this invention to provide a new and economical method for the production of the above described class of compounds which are characterized as having a crystalline structure and existing as well-defined single crystals.

A still further object of this invention is the formation and deposition of epitaxial films of the above-described materials upon substrates of the same or different materials.

It is a further object to provide chemical materials of purity suitable for use in the manufacture of electrical components such as semiconductors.

Further objects and advantages of the invention will be apparent from the following description.

The III–B—V–B compounds of the invention are of unusual purity, and have the necessary electrical properties for use as semiconductor components and are prepared by the reaction of a gaseous III–B compound or mixture thereof, and an element or mixture of elements selected from Group V–B, in the presence of hydrogen. As examples of Group III–B compounds which are gaseous under the present reaction conditions are mentioned the gallium halides, e.g., gallium trichloride, gallium tribromide, and gallium triiodide; and also alkyl gallium compounds such as trimethyl gallium, triethyl gallium, tripropyl gallium, triisopropyl gallium, and tri-tert-butyl gallium. Other Group III–B starting materials which are employed in the present invention include the corresponding halides, hydrides, and alkyl compounds of boron, aluminum, gallium and indium. Such metals are preferably employed as the halides, for example, the chlorides, bromides and iodides, although the various alkyl and halo-alkyl derivatives may similarly be used, e.g., trimethyl boron, trimethyl aluminum, trimethyl indium, triethyl boron, methyl gallium dichloride, triethyl aluminum, triisobutyl aluminum. The Group V–B elements which are of particular utility include nitrogen, phosphorus and arsenic.

In conducting the vapor phase reaction between the Group III–B compound and the Group V–B element for the production of the instant epitaxial film, it is essential that gaseous hydrogen be present in the system and that oxidizing gases be excluded. However, when the Group III–B compound is a hydride, molecular hydrogen is not needed, but may be used as a carrier. The mole fraction of the III–B component in the gas phase (calculated as the fraction of the monatomic form of the III–B compound) preferably is from 0.01 to 0.15, while the mole fraction of the V–B elemental component is from 0.05 to 0.50 (also calculated with respect to the monatomic form of the V–B compound). The mole fraction of the hydrogen may vary in the range of from 0.35 to 0.94. It should be recognized that this representation of composition imposes no limitation upon the total pressure in the system which may vary in the range of from 0.1 micron to several atmospheres, for example, 7500 mm. Hg.

The mole fraction of the Group V–B starting material is preferably at least equivalent to, and still more preferably greater than the mole fraction of the Group III–B halide, for example, gallium trichloride, or other Group III–B compound which is employed. A preferred embodiment is the use of a mole fraction for the Group V–B element which is at least twice that of the Group III–B compound. The mole fraction of hydrogen is also preferably at least twice that of the mole fraction of the Group III halide.

The temperature used in carrying out the reaction between the above described III–B compound and the V–B element in the presence of hydrogen will gneerally be above about 500° C. to as much as 1500° C., a preferred operating range being from 600° C. to 1300° C. Still more preferred ranges of temperatures for making individual products constituting species within the generic temperature range are:

| | ° C. |
|---|---|
| BP | 700–1200 |
| InP | 500–1000 |
| GaP | 700–1200 |
| GaAs | 600–1200 |
| InAs | 500–900 |
| AlP | 500–1000 |
| AlAs | 700–1200 |
| BN | 800–1200 |
| AlN | 600–1200 |

The only requirement as to temperatures is that the temperatures of the vaporized reaction components be maintained above their dew points and when these components intermix, hot enough to react. The temperatures within the III–B reservoir are usually within the range of from 80–1000° C., while those within the tube containing the V–B element range from 400–600° C. The time required for the reaction is dependent upon the temperature and the degree of mixing and reacting. The III–B compound and V–B element may be introduced individually through nozzles, as gases, or may be premixed as desired.

The apparatus which is employed in carrying out the present invention consists of a heated vessel into which the gaseous reactants are introduced either in individual streams or as a composite mixture. A preferred form of apparatus is a hot tube reactor which may be made of conventional refractories such as quartz, porcelain, etc. Such a tube may be heated by electrical resistance coils, or by direct resistance heating, for example, when employing a carborundum tube.

Various other modifications including horizontal and vertical tubes are also possible, and recycle systems in which the exit gas after precipitation of the single crystal product is returned to the system are also desirable, particularly in larger scale installations.

An advantage of the present method for the production of epitaxial films of III–B—V–B compounds by the reaction in the vapor phase of a group III–B compound and a Group V–B element, in the presence of hydrogen is the ease of obtaining high purity products. In contrast to this method, the conventional method for the preparation of III–V compounds beginning with the respective elements from the Group III and Group V series required a difficult purification technique for the metals. The conventional purification procedures are not as effective when dealing with the metals in contrast to the compounds employed in the present invention. For example, distillation, recrystallization and other conventional purification methods are readily applicable to the starting compounds employed in the present process. Furthermore, the high-temperature vapor-phase reaction employed in the present method inherently introduces another factor favoring the production of pure materials, since the vaporization and decomposition of the Group III compound and Group V element results in a further rejection of impurities. The desired reaction for the production of the III–B—V–B compound occurs only between the Group III–B compound, hydrogen, and the Group V–B element to yield the III–V compound. As a result, it is found that unusually pure materials which are of utility in various electrical and electronic applications such as in the manufacture of semiconductors are readily obtained.

The most important aspect of this invention is the provision of a means of preparing and depositing epitaxial films of the purified single crystals materials onto various substrates. These deposited films permit the fabrication of new electronic devices discussed hereinafter. The characteristic feature of epitaxial film formation is that starting with a given substrate material, e.g., gallium arsenide, having a certain lattice structure and any orientation, a film, layer or overgrowth of the same or different material may be vapor-deposited upon the substrate. The vapor deposit has an orderly atomic lattice and settling upon the substrate assumes as a miror-image the same lattice structure and geometric configuration of the substrate. When using a certain material, e.g., gallium arsenide, as the substrate and depositing another material, e.g., indium phosphide as the film deposit, it is necessary that lattice distances of the deposit material closely approximate those of the substrate in order to obtain an epitaxial film.

A particular advantage of the present method for the production of epitaxial films of III–B—V–B compounds by the reaction in the vapor phase of a Group III–B compound and a Group V–B element in the presence of hydrogen is that in forming the epitaxial layer on the substrate, the substrate is not affected and therefore sharp changes in impurity concentration can be formed. By this method it is possible to prepare sharp and narrow junctions, such as p-n junctions, which cannot be prepared by the conventional methods of diffusing and alloying.

The thickness of the epitaxial film may be controlled as desired and is dependent upon reaction conditions such as temperatures within the reaction zone, hydrogen flow rates and time of reaction. In general, the formation of large single crystals and thicker layers is favored by higher temperatures as defined above, lower hydrogen pressures and larger flow rates.

As stated hereinbefore, the epitaxial films formed in accordance with this invention comprises compounds formed from elements of Group III–B of the periodic system and particularly those having atomic weights of from 10 to 119 with elements selected from Group V–B having atomic weights of from 12 to 75. Included in this group of compounds are the nitrides, phosphides, and arsenides of boron, aluminum, gallium and indium. The bismuthides and thallium compounds, while operable, are less suitable. In addition to the preparation of the above compounds by themselves, mixtures of these compounds are also contemplated as epitaxial films, e.g., an aluminum nitride and indium phosphide mixture mixed in varying proportions produce suitable semiconductor compositions.

Other combinations of elements within the above group which are contemplated herein include ternary and quaternary compositions or mixed binary crystals, such as combinations having the formulae $GaAs_xP_{1-x}$, $InAs_xP_{1-x}$, $$GaP_xN_{1-x},\ AlP_xAs_{1-x},\ Ga_xIn_{1-x}As,\ Ga_xIn_{1-x}P\ In_xGa_{1-x}As,\ Ga_xAl_{1-x}P,\ Ga_yIn_{1-y}As_xP_{1-x}\ \text{and}\ GaAs_x(P_yN_{1-y})_{1-y}$$

$x$ and $y$ having a numerical value greater than zero and less than 1.

Materials useful as substrates herein include the same materials in the epitaxial films as just described and, in addition, compounds of Group II and VI elements (II–VI compounds) and compounds of Groups I and VII elements (I–VII compounds), and the elements silicon and germanium are suitable substrates.

As will be described hereinafter, the materials used herein either as films or substrates or both may be used in a purified state or containing small amounts of foreign material as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof, selected from Group II of the periodic system, e.g., beryllium, magnesium, zinc, cadmium and mercury are incorporated into the reaction components in order to produce p-type conductivity and tin or a tin compound such as tin tetrachloride or an element from Group VI, e.g., sulfur, selenium and tellurium, to produce n-type conductivity. These "impurities" are carried over with the reactant material into the vapor phase and deposited in a uniform dispersion in the epitaxial film of the formed product on the substrate. Since the proportion of dopant deposited with the III–V compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as $SnCl_4$ to the reservoirs of the Group III–B component, or adding a moderately volatile dopant, such as tellurium, to the Group V–B reservoir or the dopant can be added with a separate stream of hydrogen from a separate reservoir.

The substrate materials used herein may be doped by conventional means known in the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1\times10^{15}$ to $5\times10^{20}$ atmos/cc. of product.

Vapor deposits of the purified material having the same conductivity type as the substrate may be utilized to form intrinsic $pp^+$ or $nn^+$ regions.

Variations of the preceding techniques permit the formation of devices having a plurality of layers of epitaxial films each having its own electrical conductivity type and resistivity as controlled by layer thickness and dopant concentration. Since the vapor deposited materials assumes the same lattice structure as the substrate wherever the two materials contact each other, small or large areas of the substrate may be masked from or exposed to the depositing material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide is vapor deposited upon the substrate of germanium. Subsequently, a quantity of the same material with different doping agents or different concentrations of the same dopant or another of the described materials, e.g., indium phosphide may be vapor deposited from starting materials comprising these elements with a fresh quantity of hydrogen as a second epitaxial film of gallium arsenide already deposited on the substrate. This procedure with any desired combination of epitaxial and non-epitaxial layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

Various electronic devices to which these epitaxially filmed semiconductors are applicable include diodes (e.g., tunnel diodes), parametric amplifiers, transistors, high frequency mesa transistors, solar cells, thermo-photovoltaic cells, components in micromodule circuits, rectifiers, thermoelectric generators, radiation detectors, optical filters, watt-meters, and other semiconductor devices.

The invention will be more fully understood with reference to the following illustrative specific embodiments:

*Example 1*

This example illustrates the formation and deposition of an epitaxial film of p-type GaAs on n-type GaAs as the substrate.

A polished seed crystal of n-type GaAs weighing 2.98 g. and containing $5.8\times10^{18}$ carriers/cc. of tellurium dispersed therein is placed in a fused silica reaction tube located in a furnace. The GaAs seed crystal is placed on a graphite support inside said tube. The reaction tube is heated to 1000° C. and a stream of hydrogen is directed through the tube for 15 minutes to remove oxygen from the surface of the GaAs.

A stream of hydrogen is then directed through a reservoir of $GaCl_3$ maintained at about 130° C. thus vaporizing the $GaCl_3$ which is then carried by the hydrogen through a heated tube from the reservoir to the reaction tube containing the GaAs seed crystal.

Meanwhile, separate and equal streams of hydrogen are conducted through separate tubes containing in one of them a body of elemental arsenic heated to 540° C. and in the other a body of zinc chloride heated to 360° C. From these heated tubes the arsenic and zinc chloride are carried by the hydrogen on through the tubes to the reaction tube. In the system, the mole fractions of $GaCl_3$, As and hydrogen are 0.05, 0.15 and 0.80, respectively. The separate streams of vaporized arsenic, zinc chloride and $GaCl_3$ conjoin in the fused silica reaction tube where a reaction occurs between the hydrogen, arsenic and gallium in which a single crystal film of p-type gallium arsenide is formed on the seed crystal of n-type gallium arsenide forming thereon an epitaxial layer which exhibits about $10^{18}$ carriers (holes) per cc. The seed crystals after 5 hours weighs 3.54 g.

X-ray diffraction patterns of the product show that the deposited layer is single crystal in form and oriented in the same fashion as the substrate.

Rectification tests show that a p-n junction exists at the region of the junction between the epitaxial layer and the seed crystal substrate.

*Example 2*

The same procdure outlined in Example 1 is repeated, but elemental red phosphorus heated to about 450° C. is substituted for the arsenic, and gallium tribromide heated to about 230° C. is substituted for gallium trichloride. In this example, a seed crystal of n-type GaP weighing 1.56 g. and containing about $5.5\times10^{18}$ carriers/cc. of sulfur dispersed therein is used. The mole fractions of the $GaBr_3$, P and $H_2$ are 0.10, 0.20 and 0.70, respectively.

In the reaction tube, the vaporous $GaBr_3$, P, zinc dopant and hydrogen react to form p-type GaP which precipitates from the vapor phase onto the seed crystal of n-type GaP. The reaction is allowed to proceed for 7 hours, after which the GaP is removed from the reaction tube, weighed, and found to have increased in weight by 0.01 g. The crystal upon X-ray diffraction is found to consist of an overgrowth of single crystal p-type GaP having the same crystal orientation as the n-type GaP substrate. The crystal exhibits rectification showing that a p-n junction exists at the boundary between the epitaxial overgrowth and the substrate.

*Example 3*

This example illustrates the formation of a product having an n-type InP overgrowth on a p-type GaAs substrate.

The apparatus and procedure outlined in Examples 1 and 2 are used and followed, generally, except that the reservoir containing the III–B compound, i.e., indium trichloride also contains a quantity of a volatile compound to be used as the doping agent for the vapor deposited compound. To the indium trichloride in the reservoir is added $TeCl_4$ in the amount corresponding to 0.01% of the amount of $InCl_3$, i.e., a quantity to yield $1\times10^{19}$ carriers/cc. in the deposited product. In a second tube leading to the reaction tube is placed a body of elemental red phosphorus.

A seed crystal of gallium arsenide containing about $5.7\times10^{18}$ carriers/cc. of zinc dispersed therein, to provide p-type conductivity, is placed in the reaction tube located in the furnace. The furnace is then heated to 800° C. and a stream of hydrogen directed through the reaction tube for about 20 minutes to remove any oxygen present.

The reservoir of indium chloride containing the tellurium tetrachloride is heated to 430° C. to volatilize the components which are conducted by a stream of hydrogen passing through the reservoir, to the reaction tube. Simultaneously, the second tube containing the elemental red phosphorus is heated to about 500° in the presence of a stream of hydrogen. The vaporized phosphorus is also carried to the reaction tube wherein the indium chloride reacts with the phosphorus and hydrogen in the presence of the tellurium dopant to produce n-type indium phosphide which deposits from the vapor phase as a uniform layer upon the seed crystal of p-type gallium arsenide.

The product, upon examination shows an epitaxial layer of single crystal indium phosphide having the same crystal orientation as the gallium arsenide substrate, and exhibits rectification indicating the existence of a p-n junction between the epitaxial layer and the substrate.

*Example 4*

This example illustrates the preparation of an indium phosphide substrate having deposited thereon and epitaxial overgrowth of aluminum arsenide.

The procedure described in the preceding example is repeated except that the seed crystal used is p-type indium phosphide containing about $5.1 \times 10^{17}$ carriers/cc. of cadmium dispersed therein. The reservoir containing the III–B compound, i.e., methyl aluminum dichloride, also contains sufficient tin chloride doping agent to dope the subsequently formed aluminum antimonide to a carrier concentration of about $1 \times 10^{20}$ carriers/cc. The V–B element used in this example is elemental arsenic contained in a tube heated to 540° C. while passing a stream of hydrogen therethrough, while the methyl aluminum dichloride and tin tetrachloride are heated to 200° C. in a stream of hydrogen. These separate streams of hydrogen containing the vaporized reactants are then conducted to the reaction tube which is heated to 1000° C. and contains the indium phosphide seed crystal. Here, the vaporized reactants intermix forming aluminum arsenide containing the tin doping agent dispersed therein. This product precipitates from the vapor phase and deposits on the indium phosphide seed crystal.

Again X-ray diffraction patterns of the substrate crystal show that the deposited layer is single crystal in form and oriented in the same manner as the substrate.

Point contact rectification tests show the presence of a p-n junction as in preceding examples.

*Example 5*

This example illustrates the procedure for producing a product having a plurality of layers of different electrical properties.

The procedure here is similar to that followed in the preceding example, and the apparatus is the same.

The reservoirs containing the III–B compounds, gallium triiodide, is heated to 350° C. in a stream of hydrogen, while the tube containing a body of elemental arsenic is heated to about 540° C. in a stream of hydrogen and a separate tube containing $ZnCl_2$ is heated to about 360° C. in a stream of hydrogen. These separate streams of hydrogen containing the vaporized reactants are conducted to the reaction tube which contains a seed crystal of polished elemental germanium doped to a carrier concentration of about $5.8 \times 10^{18}$ atoms/cc. of phosphorus. In the reaction tube, previously flushed with hydrogen and heated to 900° C., the gallium triiodide reacts with the hydrogen, arsenic and zinc chloride dopant to form p-type gallium arsenide which deposits from the vapor phase onto the n-type germanium seed crystal. The reaction proceeds for about 15 minutes, after which the flow of the separate streams of hydrogen is discontinued temporarily. A fresh supply of arsenic doped with a trace amount of tellurium is added to replace the original arsenic source.

After the fresh source of arsenic is charged to the system, the hydrogen supply is again opened to stream through the III–B compound reservoir, again heated to 350° C. and the arsenic-tellurium source heated to 540° C. Again, the vaporized reactants are carried by the hydrogen to the reaction tube heated to 900° C. In the reaction tube the gallium triiodide reacts with the doped arsenic to form n-type gallium arsenide which deposits upon the p-type gallium arsenide layer previously deposited on the n-type germanium seed crystal.

After the reaction has proceeded to completion, the product upon examination is found to consist of a substrate of n-type germanium, having successive layers of p-type gallium arsenide and n-type gallium arsenide. These deposited layers exhibit the same X-ray orientation pattern as the single crystal germanium substrate indicating the same orientation and single crystal form characteristics of epitaxial films.

The product further exhibits rectification showing the presence of an n-p junction between the n-type gallium arsenide and the p-type gallium arsenide and a p-n junction between the latter compound and the n-type germanium substrate. When this example is repeated substituting silicon for germanium, substantially similar results occur.

By this method any number and combination of epitaxial and non-epitaxial layers may be deposited one upon the other.

An alternative to the foregoing procedure is to connect a fourth tube containing a second III–B compound reservoir and hydrogen supply to the reaction tube at a point near the junction of the tube containing the first III–B compound reservoir and the tube containing the V–B element reactant. The fourth tube is closed off during the first phase of the process, i.e., while the first epitaxial layer is being formed, and thereafter opened to the system while closing off the tube containing the first III–B compound.

A still further modification of this invention is to use a mixture of Group III–B compounds in one or more reservoirs and/or a mixture of the Group V–B elements in another reservoir(s) and proceed in the usual manner. Illustrations of this modification are shown in the following three examples:

*Example 6*

A polished seed crystal of p-type gallium phosphide containing $5.5 \times 10^{18}$ carriers/cc. of zinc dispersed therein is placed in the fused silica reaction tube. The tube is heated to 1000° C. and a stream of hydrogen is directed through the tube for 15 minutes to remove any oxygen present.

A mixture of gallium trichloride and indium trichloride is placed in the reservoir for the III–B compound reactant as described in preceding examples, and a body of elemental phosphorus is placed in another tube connected to the reaction tube. The phosphorus contains about 0.1% tellurium.

A stream of hydrogen is then directed through the reservoir containing the mixture of III–B halides and heated to about 130° C., while a stream of hydrogen is then passed over the phosphorus in the other tube heated to about 500° C. The vaporized components in both tubes are then carried by the hydrogen to the reaction tube containing the gallium phosphide seed crystal. In the reaction tube heated to 1000° C., the vaporized gallium chloride-indium chloride mixture combines and reacts with the vaporized phosphorus and tellurium to form a gallium indium phosphide mixed binary crystal which deposits from the vapor phase in single crystal form as an epitaxial film on said p-type gallium phosphide seed crystal. The n-type mixed crystal layer is shown by X-ray diffraction patterns to have the same crystal orientation as the seed crystal, characteristic of epitaxial layers and upon analysis is found to have the formula $$Ga_{0.71}In_{.29}P$$

*Example 7*

This example illustrates the preparation of an epitaxial film of a three component mixed binary crystal of III–V elements on a gallium arsenide substrate.

A seed crystal of gallium arsenide containing $5.8 \times 10^{19}$ carriers/cc. of zinc is placed in the fused silica reaction tube which is flushed with hydrogen to remove oxygen. A quantity of triethyl gallium is placed in the reservoir for the III–B compound, and a mixture of elemental arsenic and red phosphorus containing about 0.1% of tellurium is placed in a second tube connected to the reaction tube. (A variation of this arrangement is to use three tubes connected to the reaction tube, one tube containing the reservoir for III–B compound and the remaining two tubes each containing a separate V–B element.)

The III–B reservoir is then heated to about 150–175° C. and the tube containing the V–B elements to about 500–525° C., while hydrogen streams are directed through both tubes. The vaporized components in both tubes are carried by the hydrogen to the reaction tube containing the seed crystal. In the reaction tube, heated to 1000° C., the triethyl gallium reacts with the vaporized arsenic-phosphorus mixture containing the dopant tellurium particles to form a mixed binary compound, which upon analysis is found to have the formula $GaAs_{0.1}P_{0.9}$, which deposits from the vapor phase onto the gallium arsenide seed crystal.

Analysis of the filmed product shows uniform crystal orientation in both layer and substrate indicating epitaxial connection of the layer to the substrate. This product likewise exhibits rectification, showing the existence of a p-n junction between the tellurium doped n-type epitaxial layer and the zinc doped p-type galium arsenide seed crystal.

By varying the hydrogen flow rates through the respective phosphorus and arsenic reservoirs according to the aforementioned variation of this example, epitaxial films of ternary compositions over the whole range of $$GaP_xAs_{1-x}$$

are obtained, where $x$ has a value less than 1 and greater than zero.

In accordance with the present embodiment of this invention, epitaxial films of ternary compositions of III–B—V–B elements may be prepared merely by reacting one volatile compound of Group III–B elements with two Group V–B elements or vice-versa, i.e., by reacting two Group III–B compounds with one Group V–B element in the presence of hydrogen. Thus, epitaxial films of these ternary compositions may be formed by reacting a sum of three Group III–B compounds and Group V–B elements in any combination in the presence of hydrogen.

*Example 8*

This example illustrates the preparation of epitaxial films of quaternary mixed binary crystals of III–V elements.

A mixture of gallium and indium trichlorides is placed in one reservoir and a mixture of arsenic and phosphorus containing a small amount of tellurium is placed in a second reservoir. Both reservoirs are connected to a quartz reaction tube containing a polished seed crystal of zinc-doped GaAs. (This arrangement may be varied a number of ways, e.g., by placing each reactant in separate reservoirs along a common conduit to the reaction tube or each reservoir may have its own conduit to the reaction tube.)

The reservoir containing the gallium and indium trichlorides is then heated to about 130° C. and the reservoir containing the tellurium-doped phosphorus-arsenic mixture is heated to about 500–525° C. while hydrogen streams are directed through both tubes. The vaporized components in both reservoirs are then conducted by the hydrogen through quartz tubes to the reaction tube which is heated to about 1100–1150° C. The separate streams of hydrogen carrying the reactants converge in the reaction tube where the gallium and indium trichlorides are reacted with the phosphorus and arsenic containing tellurium for about 1 hour in the presence of hydrogen to form a four-component mixed binary crystal having the formula $Ga_{0.7}In_{0.3}As_{0.1}P_{0.9}$ which deposits as an eptiaxial film on the GaAs seed crystal.

This product, having a gallium arsenide substrate of p-type conductivity and an eptiaxial film of n-type conductivity, exhibits rectification suitable for use in semiconductor devices.

Similarly, other four-component mixed binary crystals of III–V compounds may be deposited as epitaxial films merely by reacting in the presence of hydrogen at least one volatile compound of Group III–B elements with at least one Group V–B element, provided that the sum of the III–B compounds and the V–B elements reacted equals four. That is, one, two or three Group III–B compounds may be reacted with, respectively, three, two or one Group V–B elements in the presence of hydrogen to produce epitaxial films of the quaternary compositions of III–V elements of this embodiment of the present invention.

*Example 9*

This example illustrates the deposition of an epitaxial film of indium arsenide onto a substrate of a I–VII compound having the cubic zinc blende structure typified by single crystal copper iodide.

A polished seed crystal of single crystal copper iodide having approximate dimensions of 2 mm. thick, 15 mm. wide and 20 mm. long is placed in a fused silica reaction tube located in a furnace. The reaction tube is heated to 550° C. and a stream of hydrogen is directed through the tube for 15 minutes to remove oxygen from the system.

A stream of hydrogen is then directed through a reservoir of $InCl_3$ containing about 0.0001% $TeCl_4$ and maintained at about 430° C. thus vaporizing the $InCl_3$ and $TeCl_4$ which are then carried by the hydrogen through a heated tube from the reservoir to the reaction tube containing the copper iodide seed crystal.

Meanwhile, a separate and equal stream of hydrogen is conducted through a separate tube containing a body of elemental arsenic heated to 540° C. From this heated tube the vaporized arsenic is carried by the hydrogen on through the tube to the reaction tube. In the system, the mole fractions of $InCl_3$, arsenic and hydrogen are 0.05, 0.15 and 0.80, respectively.

The separate streams of hydrogen from the $InCl_3$ and arsenic conjoin in the fused silica reaction tube where a reaction occurs between the hydrogen, arsenic and indium trichloride in which a single crystal form of n-type indium arsenide is formed as a film-deposit on the single crystal copper iodide substrate.

X-ray diffraction patterns of the film deposit and substrate show that the deposited layer is single crystal in form and has the same lattice orientaiton as the substrate, hence, the indium arsenide forms an epitaxial film on the single crystal copper iodide substrate.

The Hall coefficient of the film of InAs on the copper iodide substrate is found to be $-300$ cm.$^3$/coulomb, making it of utility in magnetic Hall devices. The film also exhibits photoconduction.

While the foregoing example has illustrated the use of single crystal I–VII compounds using copper iodide as the substrate, in a similar manner the fluorides, chlorides, bromides and iodides of copper, silver and gold having the zinc blende structure are likewise used as substrates for epitaxial overgrowth of III–V compounds. Similarly, single crystal I–VII compounds having the cubic sodium chloride type structure may be used as substrate for epitaxial growth of III–V compounds when the I–VII crystal face upon which growth is to occur is the (III) crystallographic face. In this manner, the fluorides, chlorides, bromides and iodides of sodium, lithium, potassium, rubidium and cesium are used as substrates. Preferred I–VII compounds include copper fluoride, copper chloride, copper bromide, copper iodide, and silver iodide.

*Example 10*

This example illustrates the deposition of an epitaxial film of gallium arsenide onto a substrate of a II–VI compound having the cubic zinc blende structure typified by single chystal zinc selenide.

A polished seed crystal of single crystal n-type zinc selenide (doped with boron) having approximately dimensions 2 mm. thick, 10 mm. wide and 15 mm. long is placed in a fused silica reaction tube located in a furnace. The reaction tube is heated to 850° C. and a stream of hydrogen is directed through the tube for 15 minutes to remove oxygen therefrom.

A stream of hydrogen is then directed through a reservoir of gallium chloride maintained at 130° C. thus vaporizing the gallium chloride which is then carried by the hydrogen through a heated tube from the reservoir to the reaction tube containing the zinc selenide seed crystal.

Meanwhile, separate and equal streams of hydrogen are conducted through two separate tubes containing, respectively, a body of elemental arsenic heated to 540° C. and a body of zinc chloride heated to 360° C. From these heated tubes the arsenic and zinc chloride are carried by the hydrogen on through the tubes to the reaction tube. In the system, the mole fractions of $GaCl_3$, As and hydrogen are 0.05, 0.15 and 0.80, respectively.

The separate streams of hydrogen from the $GaCl_3$, As and $ZnCl_2$ conjoin in the fused silica reaction tube where a reaction occurs between the hydrogen, arsenic and gallium trichloride in which a single crystal form of p-type gallium arsenide is formed as a film-deposit on the single crystal n-type zinc selenide substrate.

X-ray diffraction patterns of the film deposit and substrate show that the deposited layer is single crystal in form and has the same lattice orientation as the substrate, hence, the gallium arsenide forms an epitaxial film on the single crystal zinc selenide substrate.

The crystal exhibits rectification showing that a p–n junction exists at the boundary between the epitaxial overgrowth and the substrate.

While the foregoing example has illustrated the use of single crystal II–VI compounds using zinc selenide as the substrate, in a similar manner the sulfides, selenides and tellurides of beryllium, zinc, cadmium, and mercury are likewise used as substrates for epitaxial overgrowths of III–V compounds. Similarly, single crystal II–VI compounds having the cubic sodium chloride type structure may be used as substrates for epitaxial growth of the III–V compounds when the II–VI crystal face upon which growth is to occur is the (III) crystallographic face. In this manner, the oxides, sulfides, selenides and tellurides of magnesium, calcium, strontium and barium, as well as cadmium oxide, are used as substrates. Preferred II–VI compounds include zinc sulfide, zinc selenide, zinc telluride, cadmium sulfide, cadmium selenide, cadmium telluride, mercury sulfide, mercury selenide, mercury telluride, beryllium sulfide, beryllium selenide and beryllium telluride.

It will be seen that the products obtained according to the present invention have a variety of applications. For example, in electronic devices where it is desirable to have a substantially inert, non-conducting base for III–V semiconductors the product described in Example 8 is highly suitable. Where it is desired to obtain semiconductor components having semiconducting properties in the base material as well as in the epitaxial film, those products described in Examples 1–7 and Example 9 above are of particular value.

Electronic devices may also be fabricated wherein a semiconducting component comprising an epitaxial film of III–V compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such as Al-Zn, SbCoMn, BTi and $Cr_2Ti$.

Various other modifications of the instant invention will be apparent to those skilled in the art without departing from the spirit and scope thereof.

I claim:

1. Process for the production and deposition of epitaxial films of compounds of Group III–B elements having atomic weights of from 10 to 119 and elements selected from Group V–B having atomic weights of from 12 to 75, in the Hubbard periodic table and mixtures thereof, onto a substrate material selected from the same class of compounds comprising the epitaxial film, I–VII compounds, II–VI compounds, germanium and silicon, which comprises reacting in the vapor phase at least one volatile compound of Group III–B elements together with at least one element selected from Group V–B in the presence of hydrogen, and contacting the resulting reaction mixture with said substrate whereby a purified single crystal form of at least one III–V compound is formed and deposited from said reaction mixture as an epitaxial film on said substrate.

2. Process for the production and deposition of epitaxial films of compounds of Group III–B elements having atomic weights of from 10 to 119 and elements selected from Group V–B having atomic weights of from 12 to 75, in the Hubbard periodic table and mixtures thereof, onto a substrate material selected from the same class of compounds comprising the epitaxial film, I-VII compounds, II–VI compounds, germanium and silicon, which comprises reacting in the vapor phase at temperatures within the range of from 500° C. to 1500° C. at least one volatile compound of Group III–B elements selected from the class consisting of halides, hydrides and alkyl derivatives together with at least one Group V–B element in the presence of hydrogen, and contacting the resulting reaction mixture with said substrate whereby a purified single crystal form of at least one III–V compound is deposited from said reaction mixture as an epitaxial film on said substrate.

3. Process according to claim 2 wherein said Group III–B compound is gallium trichloride, said Group V–B element is arsenic and said III–V compound deposited as an epitaxial film is gallium arsenide.

4. Process according to claim 2 wherein said Group III–B compound is triethyl gallium, said Group V–B element is phosphorus and said III–V compound is gallium phosphide.

5. Process for the production and deposition of epitaxial films of compounds of Group III–B elements having atomic weights of from 10 to 119 and elements selected from Group V–B having atomic weights of from 12 to 75, in the Hubbard periodic table and mixtures thereof, said compounds having p-type conductivity by incorporation therein of a small amount of a doping agent selected from Group II of the periodic system, onto a substrate material selected from the same class of compounds comprising the epitaxial film, I–VII compounds, II–VI compounds, germanium and silicon, said substrate having n-type conductivity by incorportion therein of a small amount of a doping agent selected from Group VI of the periodic system, which comprises reacting in the vapor phase at least one volatile compound of Group III–B elements together with at least one element selected from Group V–B in the presence of hydrogen, and contacting the resulting reaction mixture with said substrate whereby a purified single crystal form of at least one III–V compound is deposited from said reaction mixture as an epitaxial film on said substrate forming a p-n junction therewith.

6. Process for the production and depostion of an epitaxial film of p-type gallium arsenide onto a substrate of n-type gallium arsenide, which comprises reacting in the vapor phase gallium trichloride with elemental arsenic in the presence of hydrogen and a doping agent selected from Group II and contacting the resulting reaction mixture with said substrate whereby a purified single crystal form of gallium arsenide containing a small amount of said doping agent dispersed therein is deposited from said reaction mixture as an epitaxial film having p-type conductivity on said substrate, having n-type conductivity thereby forming a p–n junction.

7. Process for the production and deposition of epitaxial films of compounds of Group III–B elements having atomic weights of from 10 to 119 and elements selected from Group V–B having atomic weights of from 12 to 75, in the Hubbard periodic table and mixtures thereof, said compounds having n-type conductivity by incorporation therein of a small amount of a doping agent selected from Group VI of the periodic system, onto a substrate material selected from the same class of compounds comprising the epitaxial film, I–VII compounds, II–VI compounds, germanium and silicon, said substrate having p-type conductivity by incorporation therein of a small amount of a doping agent selected from Group II of the periodic system, which comprises reacting in the vapor phase at least one volatile compound of Group III–B elements together with at least one element selected from Group V–B in the presence of hydrogen, and contacting the resulting reaction mixture with said substrate whereby a purified single crystal form of at least one III–V compound is deposited from said reaction mixture as an epitaxial film on said substrate forming a p–n junction therewith.

8. Process for the production and deposition of an epitaxial film of n-type gallium phosphide onto a substrate of p-type gallium phosphide, which comprises reacting in the vapor phase gallium tribromide with elemental phosphorus in the presence of hydrogen and a doping agent selected from Group VI, and contacting the resulting reaction mixture with said substrate whereby a purified single crystal form of gallium phosphide containing a small amount of said doping agent dispersed therein is deposited from said reaction mixture as an epitaxial film having n-type conductivity on said substrate having p-type conductivity, thereby forming an n–p junction.

9. Process for the production and deposition of epitaxial films of mixed binary crystals comprising elements selected from Group III–B having atomic weights of from 10 to 119 and elements selected from Group V–B having atomic weights of from 12 to 75, in the Hubbard periodic table onto a substrate material selected from the class consisting of III–V compounds, I–VII compounds, II–VI compounds, germanium and silicon, which comprises reacting in the vapor phase at least one volatile compound of Group III–B elements together with at least one Group V–B element provided that the sum of the Group III–B compounds and Group V–B elements reacted is greater than two, in the presence of hydrogen and contacting the resulting reaction mixture with said substrate whereby a purified single crystal form of mixed binary crystals is deposited from said reaction mixture as an epitaxial film on said substrate.

10. Process for the production and deposition of epitaxial films of three-component mixed binary crystals comprising elements selected from Group III–B having atomic weights of from 10 to 119 and elements selected from Group V–B having atomic weights of from 12 to 75, in the Hubbard periodic table onto a substrate material selected from the class consisting of III–V compounds, I–VII compounds, II–VI compounds, germanium and silicon, which comprises reacting in the vapor phase at least one volatile compound of Group III–B elements together with at least one Group V–B element, provided that the sum of the Group III–B compounds and Group V–B elements reacted equals three, in the presence of hydrogen, and contacting the resulting reaction mixture with said substrate material, whereby a purified single crystal form of three-component mixed binary crystals is deposited from said reaction mixture as an epitaxial film on said substrate.

11. Process according to claim 10 wherein said volatile III–B compound is gallium trichloride and said Group V–B elements are arsenic and phosphorus.

12. Process according to claim 11 wherein said mixed binary crystal is gallium arsenide phosphide having the formula $GaAs_xP_{1-x}$ where $x$ has a value greater than zero but less than one, and said substrate is gallium arsenide.

13. Process for the production and deposition of epitaxial films of four-component mixed binary crystals comprising elements selected from Group III–B having atomic weights of from 10 to 119 and elements selected from Group V–B having atomic weights of from 12 to 75, in the Hubbard periodic table onto a substrate material selected from the class consisting of III–V compounds, I–VII compounds, II–VI compounds, germanium and silicon, which comprises reacting in the vapor phase at least one volatile compound of Group III–B elements together with at least one Group V–B element, provided that the sum of the Group III–B compounds and Group V–B elements reacted equals four, in the presence of hydrogen, and contacting the resulting reaction mixture with said substrate material, whereby a purified single crystal form of four-component mixed binary crystals is deposited from said reaction mixture as an epitaxial film on said substrate.

14. Process for the production and deposition of a plurality of epitaxial layers of compounds selected from the group consisting of compounds of Group III–B elements having atomic weights of from 10 to 119 and Group V–B elements having atomic weights of from 12 to 75, in the Hubbard periodic table and mixtures thereof, onto a substrate material selected from the same class of compounds comprising said epitaxial layers, I–VII compounds, II–VI compounds, germanium and silicon, which comprises as a first step reacting in the vapor phase at least one volatile compound of Group III–B elements together with at least one Group V–B element in the presence of hydrogen, and contacting said resulting reaction mixture with said substrate whereby a single crystal form of at least one III–V compound is deposited from said vapor phase as a first epitaxial layer on said substrate, repeating this procedure as many times as the number of layers desired, but providing modified electrical properties in each succeeding layer by inclusion therein of small amounts of doping agents.

References Cited by the Examiner

UNITED STATES PATENTS

| | | | |
|---|---|---|---|
| 2,692,829 | 10/1954 | Christensen et al. | 148—175 |
| 2,759,861 | 8/1956 | Collins | 148—1.5 |
| 2,798,989 | 7/1957 | Welker | 148—1.5 |
| 2,858,275 | 10/1958 | Folberth | 148—1.5 |
| 2,974,064 | 3/1961 | Williams et al. | 252—62.3 |
| 3,072,507 | 1/1963 | Anderson | 148—33.4 |

FOREIGN PATENTS

| | | |
|---|---|---|
| 1,029,941 | 5/1958 | Germany. |
| 1,193,194 | 10/1959 | France. |

OTHER REFERENCES

Antell et al.: Preparation of Crystals of InAs, InP, GaAs, and GaPly by a Vapor Phase Reaction, Journal of the Electrochemical Society, June 1959, pp. 509–510.

Holonyak, Jr., et al.: Article in AIME Publication of Metallurgy of Semiconductor Materials, Aug. 30–Sept. 1, 1961, vol. 15, Interscience publishers, pp. 49–59.

Lyons et al.: "Forming a Compound PN Junction," IBM Technical Disclosure Bulletin, volume 3, No. 8, January 1961, p. 31.

Marinace: "Vapor Growth of InSb Crystals by an Iodine Reaction," IBM Technical Disclosure Bulletin, volume 3, No. 8, January 1961, p. 33.

DAVID L. RECK, *Primary Examiner.*

WINSTON A. DOUGLAS, ROGER L. CAMPBELL, *Examiners.*

W. C. TOWNSEND, M. A. CIOMEK, N. F. MARKVA, *Assistant Examiners.*